(12) United States Patent
Matviya

(10) Patent No.: US 7,883,683 B2
(45) Date of Patent: Feb. 8, 2011

(54) CARBON FOAM AND HIGH DENSITY CARBON FOAM ASSEMBLY

(75) Inventor: Thomas M. Matviya, McKees Rocks, PA (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 885 days.

(21) Appl. No.: 11/751,651

(22) Filed: May 22, 2007

(65) Prior Publication Data

US 2010/0136320 A1 Jun. 3, 2010

Related U.S. Application Data

(63) Continuation-in-part of application No. 11/619,223, filed on Jan. 3, 2007, now Pat. No. 7,628,973, which is a continuation-in-part of application No. 11/393,308, filed on Mar. 30, 2006.

(60) Provisional application No. 60/594,355, filed on Mar. 31, 2005.

(51) Int. Cl.
*C01B 31/00* (2006.01)
*C01B 31/04* (2006.01)
*C10L 5/00* (2006.01)
*H01M 4/58* (2010.01)

(52) U.S. Cl. ............ 423/445 R; 423/448; 44/620; 429/231.8

(58) Field of Classification Search ............ 423/445 R, 423/448; 44/620; 429/231.8
See application file for complete search history.

(56) References Cited

U.S. PATENT DOCUMENTS

| | | | |
|---|---|---|---|
| 5,709,914 A * | 1/1998 | Hayes | 428/35.1 |
| 2002/0141932 A1* | 10/2002 | Klett et al. | 423/445 R |
| 2004/0221529 A1* | 11/2004 | Zornes | 52/311.1 |

* cited by examiner

*Primary Examiner*—Karl E Group
*Assistant Examiner*—Noah S Wiese
(74) *Attorney, Agent, or Firm*—Philip D. Lane

(57) ABSTRACT

An assembly comprising carbon foam and high density carbon foam is described. In some embodiments, such an assembly may be a composite or composite assembly. One or more pieces of carbon foam and high density carbon foam may comprise the assembly. The assembly may comprise other materials in addition to the carbon foam and high density carbon foam. One or more of any given type of other material may be incorporated into the composite. Additionally, a given other material may be incorporated in more than one volume or location on or in the assembly. The other materials may provide for bonding of the elements of the assembly together, strengthening of the assembly, increased assembly oxidation and weathering resistance, modification of the electrical, thermal, or fluid transport properties of the assembly, and any of a number of other purposes.

20 Claims, 4 Drawing Sheets

CARBON FOAM AND HIGH DENSITY CARBON FOAM ASSEMBLY

CROSS-REFERENCE TO RELATED APPLICATIONS

This application is a continuation-in-part of U.S. patent application Ser. No. 11/619,223, filed Jan. 3, 2007 entitled "Simultaneous Production of High Density Carbon Foam Sections" which is a continuation-in-part of U.S. patent application Ser. No. 11/393,308, filed Mar. 30, 2006 entitled "High Density Carbon Foam", which is based on U.S. Provisional Patent Application No. 60/594,355, filed on Mar. 31, 2005, and which all above referenced applications are herein specifically incorporated by reference in their entireties.

FIELD OF THE INVENTION

This invention relates to assemblies comprising high density carbon and carbon foam. In various embodiments, the assemblies may be in the form of composite assemblies.

BRIEF SUMMARY OF THE INVENTION

Embodiments of the present invention are directed to an assembly comprising at least one section of high density carbon foam and at least one section of carbon foam. In some embodiments, the high density carbon foam section and the carbon foam section may be adjacent to one another. In other embodiments, the high density carbon foam section and the carbon foam section may be near one another. In still other embodiments, the high density carbon foam section and the carbon foam section may be spaced a distance apart from one another. In further other embodiments, the high density carbon foam section and the carbon foam section may be separated by an other material. In still further embodiments, assemblies are provided that are comprised of at least one section of carbon foam and at least one section of high density carbon foam joined together at a point of mutual contact. In some embodiments, assemblies comprising at least one section of carbon foam and at least one section of high density carbon foam may be considered to be composite assemblies. Further, embodiments of the invention are also directed to methods for producing such assemblies. As used herein, high density carbon foam may be referred to as HDCF in the singular or plural tense.

BRIEF DESCRIPTION OF THE SEVERAL VIEWS OF THE DRAWING(S)

DETAILED DESCRIPTION OF THE INVENTION

Figure 3:
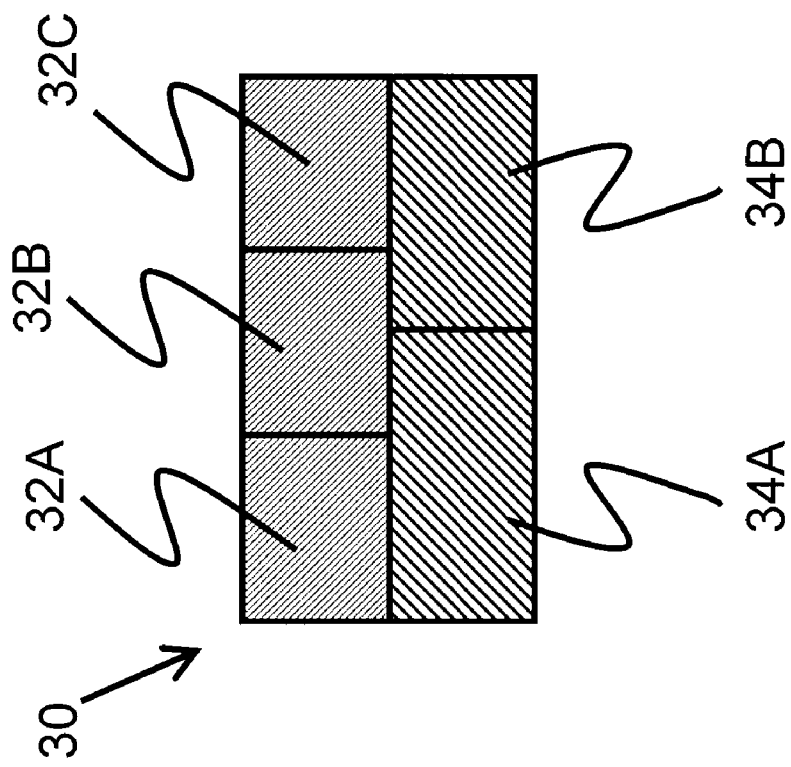
FIG. 3 is a diagrammatic cross-sectional view of an assembly in accordance with yet another embodiment of the invention.

Embodiments of the present invention are directed to an assembly comprising at least one section of high density carbon foam and at least one section of carbon foam, where the high density carbon foam section and the carbon section are held in a fixed relationship. In some embodiments, the high density carbon foam section and the carbon foam section may be adjacent to one another. In other embodiments, the high density carbon foam section and the carbon foam section may be near one another. In still other embodiments, the high density carbon foam section and the carbon foam section may be spaced a distance apart from one another. In further other embodiments, the high density carbon foam section and the carbon foam section may be separated by other material(s). In still further embodiments, assemblies are provided that are comprised of at least one section of carbon foam and at least one section of high density carbon foam joined together at a point of mutual contact. In some embodiments, assemblies comprising at least one section of carbon foam and at least one section of high density carbon foam may be considered to be composites, or composite assemblies.

As will be discussed in detail below, some embodiments of an assembly may comprise one or more of a variety of other materials. Such other materials comprising an assembly may serve any of a number of purposes. For example, in some embodiments, such other materials may bond or otherwise secure elements of the assembly together. In other embodiments, such other materials may serve to at least partially surface coat an assembly or elements of the assembly. In still other embodiments, such other materials may fully or partially impregnate one or more elements of an assembly. In still further embodiments, such other materials may occupy a volume of an assembly. Such a volume may be internal or external to the assembly.

The assembly will comprise at least one section of carbon foam. The assembly may comprise more than one section of carbon foam. Carbon foams are materials of very high carbon content that have appreciable void volume. Carbon foams are carbon materials. As such, carbon foams are primarily comprised of (elemental) carbon. In appearance, excepting color, carbon foams resemble readily available commercial plastic-foams. As with plastic foams, the void volume of carbon foams is located within numerous empty cells. The boundaries of these cells are defined by the carbon structure. These cells typically approximate voids of regular, but not necessarily uniform, size, shape, distribution, and orientation. The void volumes in these cells may directly connect to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume. The density of carbon foams typically is less than about 1. g/cc and generally less than about 0.8 g/cc. In some embodiments, the density for carbon foam may range from about 0.05 g/cc to about 0.8 g/cc. In some embodiments, carbon foams may exhibit compressive strengths ranging up to about 10,000 psi. In other embodiments, the compressive strength for carbon foam may range from about 100 psi to about 10,000 psi. In certain other embodiments, compressive strengths for carbon foam may range from about 400 psi to about 7,000 psi. The carbon foam used for a carbon foam section of the assembly may be carbonized carbon foam. Alternatively, if desired, the carbon foam used for a carbon foam section of the assembly may be graphitized carbon foam.

The regular size, shape, distribution, and orientation of the cells within carbon foam readily distinguish this material from other carbon materials such as metallurgical cokes. The void volumes within cokes are contained in cell-like areas of typically ovoid shape and random size, distribution, and orientation. That is, in cokes, some void volumes can be an order of magnitude, or more, larger than others. It is also not uncommon that the over-lapping of void volumes in cokes results in significant distortions in the void shape. These distortions and large void volumes can even lead to a product that has limited structural integrity in all except smaller product volumes. That is, it is not uncommon for coke to be friable and larger pieces of coke to readily break into smaller pieces with very minimal handling. Such breakage is typically not exhibited by carbon foams. Also, a given sample of coke can exhibit both open and closed-cell void volumes.

Carbon foams have been produced by a variety of methods. Some of these methods include producing carbon foams directly from particulate coal. For example, U.S. Pat. Nos. 6,749,652 and 6,814,765, each herein incorporated by reference in their entirety, describe methods for producing carbon foam directly from particulate coal. In addition to particulate coal feedstocks, carbon foam forming feedstocks, also referred to as carbon foam precursors, may include, but are not limited to, coal, pitch, coal extracts, mesophase pitches, mesophase materials, hydrogenated coals, hydrogenated coal extracts, solvent refined coals, solvent refined coal extracts, and the like. Additionally, carbonizable polymeric foams such as phenolic and furan foams may be carbonized to produce carbon foam. Typically, specific, different, processes are utilized for the production of carbon foams using each type of feedstock.

As introduced above, assemblies also comprise at least one section of HDCF. The assembly may comprise more than one section of HDCF. HDCF are those carbon foams that exhibit densities of about 1. g/cc or greater. In certain embodiments, the densities may range from about 1. g/cc to about 2. g/cc. In other embodiments, the densities may range from about 1.2 g/cc to about 1.8 g/cc. In still other embodiments, the densities may range from about 1.3 g/cc to about 1.6 g/cc. HDCF, when heated to temperatures greater than about 700° C., and more typically greater than about 950° C., followed by cooling to essentially ambient temperatures, may have compressive strengths (ASTM C365) greater than about 5,000 lbs/in$^2$, in some embodiments greater than about 10,000 lbs/in$^2$, and in other embodiments greater than about 20,000 lbs/in$^2$. Some HDCF may be electrically conductive and exhibit electrical resistivities less than about 0.002 ohm-cm. HDCF may also exhibit good thermal transport properties. In some embodiments, the HDCF may have a thermal conductivity between about 5 to 70 W/mK. In other embodiments, the HDCF exhibits an appreciable (surface) hardness. The body of these HDCF may be largely isotropic. HDCF are materials of very high carbon content that have limited void volume. HDCF are carbon materials. As such, HDCF are primarily comprised of (elemental) carbon.

To the unaided eye, HDCF may appear to be non-porous, carbonaceous solids. However, optical microscopic examination of HDCF at 10× to 100× may show some degree of porosity. In some embodiments, this porosity is evenly distributed in the foam. The porosity of the HDCF provides void volumes within the foam that are predominately in communication with one another and with the exterior of the foam, thus providing a structure that may be referred to as "open celled" or "porous".

In some embodiments, where the HDCF is produced from particulate coal, optical microscopic examination of HDCF at a magnification of about 90× shows that the HDCF is not simply comprised of sintered powders. That is, the vast majority of the coal particulates from which the foam was prepared are predominantly no longer recognizable as individual particles bonded together only at their areas of mutual contact, as would be the case in a sintered material. In appearance, the microscopic structure of the HDCF may appear similar, but not equivalent, to the structures of both carbon foams and reticulated vitreous carbons. That is, the HDCF may be comprised of defined, regular, void spaces delimited by thick, somewhat curved, interconnected carbon ligaments, which result in a continuous, open-celled, foam-like dense carbon body. Typically, the void spaces of the HDCF do not have a high population of the wide curving walls usually present in the well-defined spherical voids of low density (densities less than 1. g/cc, and more typically less than 0.5 g/cc) coal based carbon foam. The void spaces of the HDCF materials are typically significantly smaller than those observed in a typical (low-density) carbon foam material.

In other embodiments, the structure of the HDCF may appear, under microscopic examination at about 90×, to be comprised of numerous randomly interconnected and intertwined small carbon ligaments of random size and orientation. Such interconnected ligaments are continuous through the HDCF. The surfaces of these ligaments may be curved and relatively smooth, non-uniform, irregular, or even occasionally embedded with what may be the remains of coal particles that did not achieve a high degree of plastic character. In such embodiments, void spaces defined by the ligaments may be of random size and shape with limited, if any, spherical characteristics. In some embodiments, the size and number of void spaces may be inversely related to the density of the HDCF. That is, higher density HDCF may exhibit fewer, and smaller, void volumes than do lower density HDCF. Additionally, higher density HDCF may exhibit thicker ligaments than do lower density HDCF. While the pores sizes may vary within a single piece of HDCF, the majority of the pores have a relatively consistent pore size.

HDCF useful in the present invention may include any HDCF. Such HDCF may be prepared from coals. In some embodiments, for example, very hard, dense, nongraphitizable HDCF, which may be prepared from lower rank agglomerating bituminous coals, may be incorporated into an assembly. In other embodiments, for example, hard, dense, graphitizable HDCF, which may be prepared from higher rank agglomerating bituminous coals, may be incorporated into an assembly. Potentially, HDCF may also be prepared from pitches, polymeric materials, mesophase materials, coal extracts, solvent refined coals, hydrogenated coals and coal products, coal derivatives, and the like.

In some embodiments, prior to incorporation into an assembly, the HDCF may be exposed to elevated temperatures, under an inert atmosphere, sometimes as great as about 3000° C. or more. In some embodiments, the HDCF may be partially, or fully, graphitized. In other embodiments, the HDCF may be ungraphitized. In still other embodiments, the HDCF may be nongraphitzable.

HDCF and methods for production of such foams, with emphasis on the direct production from coal, are taught in U.S. patent application Ser. No. 11/393,308 filed Mar. 30, 2006, which is specifically herein incorporated by reference in its entirety. The teachings of this patent application are expanded upon in U.S. patent application Ser. No. 11/619,223, filed Jan. 3, 2007 which also is specifically herein incorporated by reference in its entirety.

Figure 1:
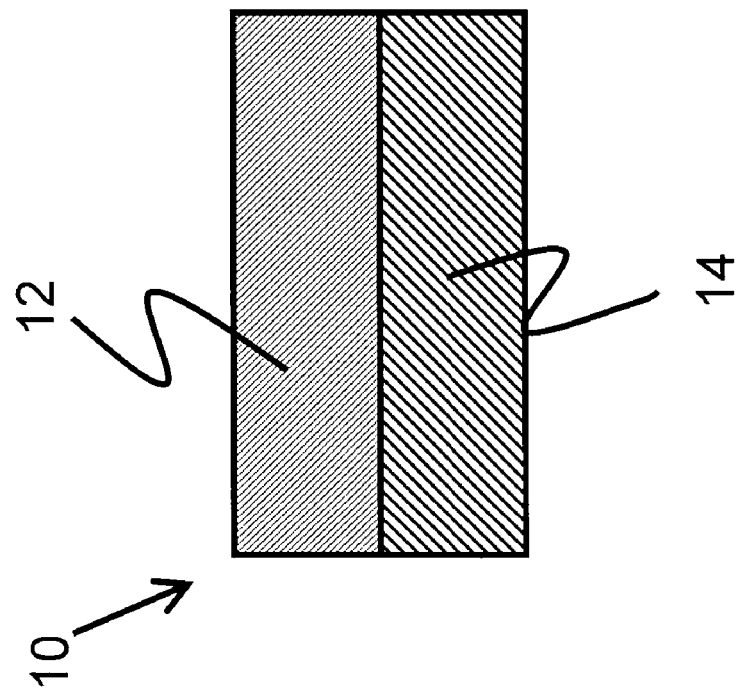
FIG. 1 is a diagrammatic cross-sectional view of an assembly in accordance with an embodiment of the invention.

Turning now to FIG. 1, there is an illustration of a cross-sectional representation of a assembly 10 in accordance with an embodiment of the invention. The assembly 10 includes at least one HDCF section 12 and at least one carbon foam section 14. The HDCF section 12 and carbon foam section 14 may be joined together at a region of mutual contact, thus forming the assembly 10. This, or other assemblies, some of which are discussed below, may be considered to be composites, or, composite assemblies. The joining of the carbon foam section 14 and the HDCF section 12 may be accomplished by the use of a bonding material.

The bonding material is applied to one or more surfaces of the carbon foam section or HDCF section and holds the section of carbon foam and section of HDCF in a substantially fixed relationship to one another. In some embodiments, the bonding material may include, but is not limited to, glues, adhesives, cements, binders, and other similar materials. Such glues, adhesives, cements, binders, and the like may be utilized to bond various elements comprising the assembly together. Suitable glues, adhesives, cements, binders, and the like, are those that may be exposed to the operating conditions to which the assembly may be exposed while still maintaining acceptable bond strength between elements of the assembly. Such glues, adhesives, cements, binders, and the like, may include, but are not limited to, graphite adhesives, ceramic adhesives, and inorganic cements including magnesia cements or silica cements. Other suitable glues, adhesives, cements, binders, and the like, may include, but are not limited to, resins, thermoplastic polymeric materials, thermosetting polymeric materials, especially carbonizing thermosetting polymeric materials, such as, for example, phenolic resins, melamine resins, and furan resins, and the like. Still other suitable glues, adhesives, cements, binders, and the like, may include electrically conductive adhesives, metal filled adhesives, carbon filled adhesives, epoxies, vinyl esters, commercially available adhesives and binders, and other like materials known to those skilled in the art.

Figure 2:
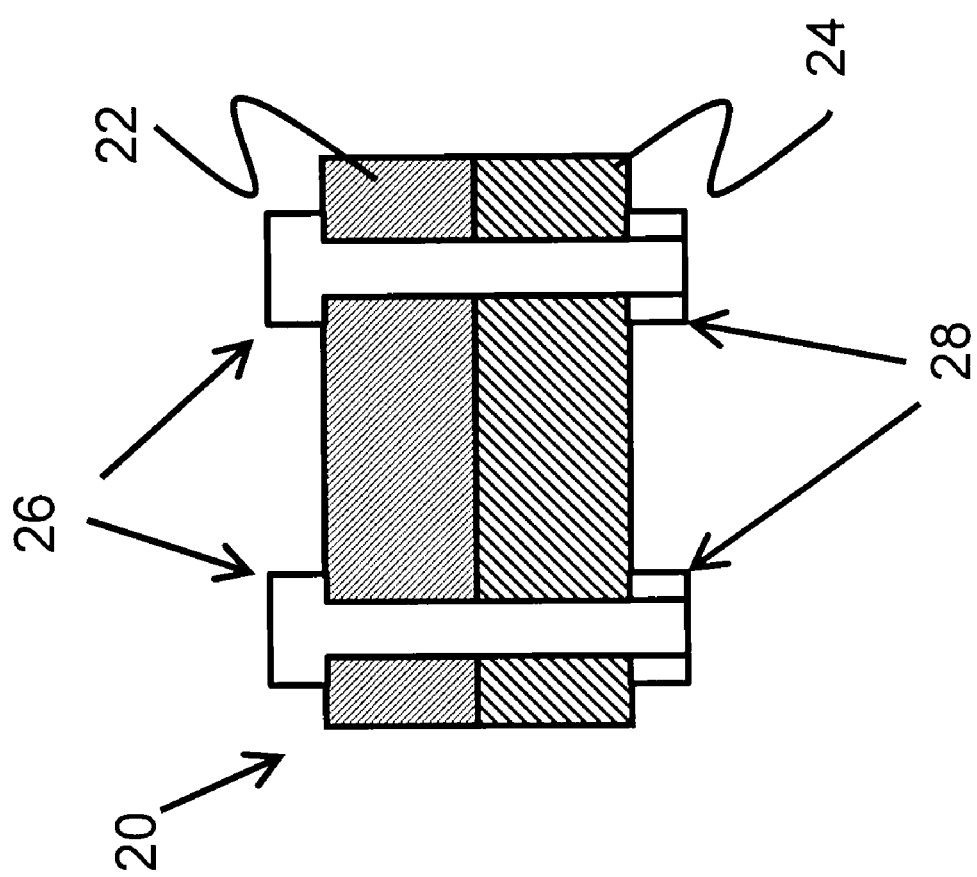
FIG. 2 is a diagrammatic cross-sectional view of an assembly in accordance with another embodiment of the invention.

Alternatively, one or more sections of carbon foam and one or more sections of HDCF may be held in a relatively fixed relationship(s) to one another by joining the carbon foam section(s) and the HDCF section(s) using mechanical fasteners such as screws, nails, clips, strapping, and other similar mechanical fasteners. As shown in FIG. 2, an embodiment of an assembly 20 comprising HDCF 22 and carbon foam 24 is joined by bolts 26 and nuts 28.

In additional embodiments, more than one section of carbon foam may be used in a given assembly. Likewise, more than one section of HDCF may be used in a given assembly. FIG. 3 provides an illustration of a cross-sectional representation of an assembly 30 in accordance with yet another embodiment of the invention. The assembly 30 has three sections of HDCF 32A, 32B, and 32C which are joined with two sections of carbon foam 34A and 34B. As discussed above, the HDCF sections and the carbon foam sections may be joined together by the use of glues, adhesives, cements, and other similar bonding techniques. Alternatively, joining of the carbon foam sections and the HDCF sections may be accomplished may be by mechanical fasteners such as screws, bolts, nails, clips, strapping, and other similar mechanical fasteners.

Figure 4:
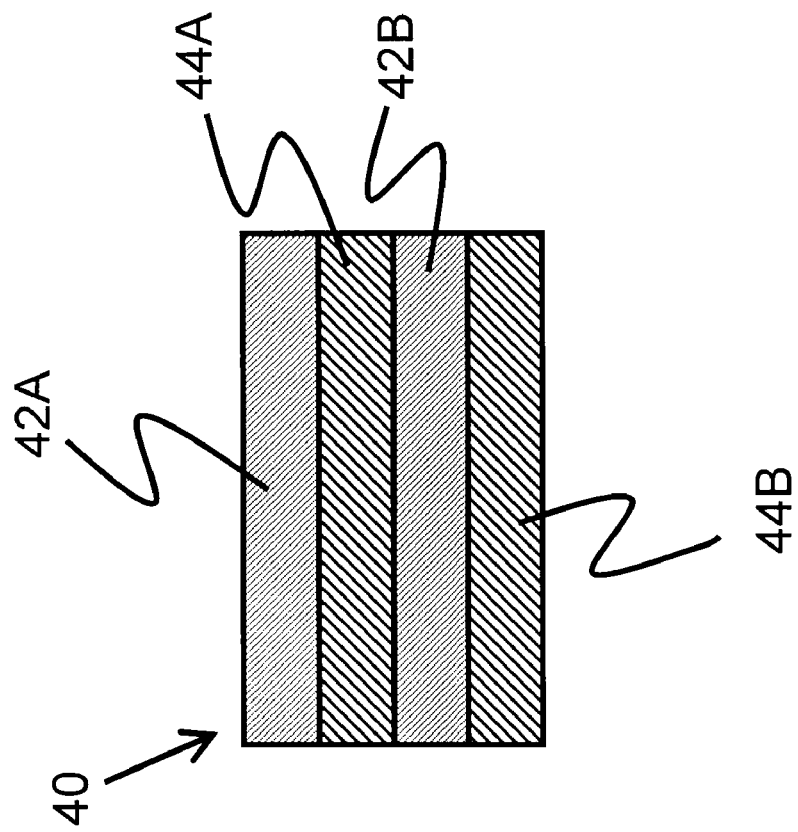
FIG. 4 is a diagrammatic cross-sectional view of an assembly in accordance with a further embodiment of the invention.

In further embodiments, alternating sections of carbon foam and HDCF may be arranged in an assembly. For example, as illustrated in FIG. 4, a further embodiment of an assembly 40 comprises sections of HDCF 42A and 42B alternating with sections of carbon foam 44A and 44B. These alternating sections may be adhered, or otherwise joined, together as discussed above by use of glues, adhesives, cements, and other similar bonding materials. Alternatively, joining of the carbon foam sections and the HDCF sections may be accomplished may be by mechanical fasteners, or mechanical means, as discussed above.

In some embodiments, one or more surfaces of the section of carbon foam and/or the section of HDCF may by covered or coated with a surface coating. Alternatively one or more surfaces of the-assembly may include a surface coating. Surface coatings may be predominately on the surface of the assembly body or carbon foam or HDCF elements of the assembly. Alternatively, such surface coatings may impregnate the assembly body, the carbon foam section, or the HDCF section to some limited depth. Surface coatings may serve, for example, to modify the surface hardness, impact resistance, oxidation resistance, coefficient of friction, surface porosity, permeability, color, reflectivity, and/or heat transfer properties of the assembly. In some embodiments, surface coatings may include, but are not limited to, ceramics or ceramic precursors, metals, paints, carbon, graphite, thermoplasitc or thermosetting polymeric materials (including but not limited to, epoxies, phenolic resins, nylons, polycarbonates, acrylics, polyethylene, polypropylene, polystyrene, and the like), cellulose based materials, composites, fibers, tars and other similar high viscosity organic materials including pitches and asphalts, and other similar materials.

Figure 5:
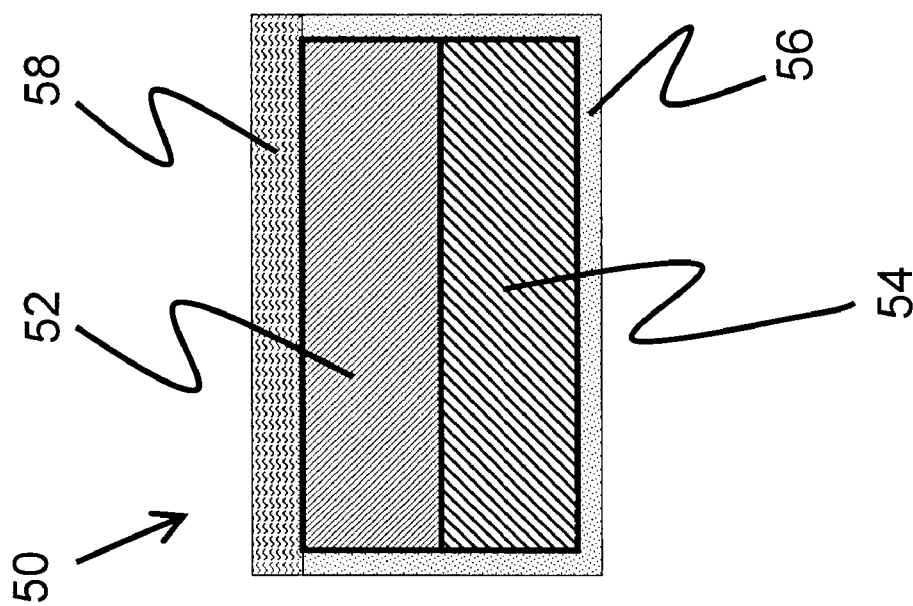
FIG. 5 is a diagrammatic cross-sectional view of an assembly in accordance with an additional embodiment of the invention.

Turning now to FIG. 5, there is illustrated an assembly 50 comprising HDCF 52 and carbon foam 54 in accordance with an embodiment of the invention. The assembly 50 comprises two different surface coatings 56 and 58. A first surface coating 56 covers selected surfaces of the HDCF 52 and the carbon foam 54. A second surface coating 58 predominately covers a surface of the HDCF 52. The surface coatings 56 and 58 may be any of those previously described. In this particular example, first surface coating 56 may comprise a polymeric material and second surface coating 58 may comprise, for example, a graphite fiber polymeric composite.

In still further embodiments, one or more sections of carbon foam and/or HDCF may be partially, mostly, or fully impregnated or otherwise infiltrated with an inpregnate. In some embodiments, the impregnate may serve to fill a majority of the internal void volumes of one or more elements of the assembly. The internal void volumes of these elements may be fully or partially filled with the impregnate. Such impregnations may serve to alter the properties of these-assembly elements. Altered properties may include density, strength, and fluid permeability, for example. Suitable impregnates may include essentially any material that may be introduced into the internal void volumes of the assembly elements and retained in those volumes. Additionally, suitable impregnates are those capable of tolerating the conditions of use to which the assembly will be subjected. In some embodiments, suitable impregnates may include, but are not limited to, ceramics or ceramic precursors, metals, carbon, graphite, thermoplasitc or thermosetting polymeric materials (including but not limited to, epoxies, phenolic resins, nylons, polycarbonates, acrylics, polyethylene, polypropylene, polystyrene, and the like), tars and other similar high viscosity organic materials including pitches and asphalts, and the like. In many embodiments, such impregnates are introduced into the assembly elements as, or in, a fluid (including both gases and liquids). After impregnation, the fluid is cured, cooled, dissipated, or otherwise essentially solidified, or removed, to provide the impregnate within an interior volume of a assembly element. In other embodiments, one or more elements of the assembly may be impregnated with impregnates selected such that they remain in the fluid state following impregnation. In such embodiments, surface coatings may be utilized to retain the fluid within the assembly element internal volume.

The surface coatings or impregnates may serve to alter the properties of the assembly. These materials may provide for bonding of the elements of the assembly together, strengthening of the assembly, increased assembly oxidation and weathering resistance, modification of the electrical, thermal, or fluid transport properties of the assembly, and any of a number of other purposes. A given other material may be utilized for more than one purpose in a assembly. For example, a given other material may improve the strength while simultaneously decreasing the heat transfer properties of a given composite. As an other example, a given other material may be utilized to bond or otherwise join two of more elements of a given composite together while simultaneously impregnating one or more elements of the given composite In other embodiments, the composite may further comprise other elements which are not carbon foam or HDCF elements. Such other elements may be comprised of other materials as discussed above. One or more of these other elements may be positioned in internal and/or external volumes of the assembly. The occupation of such volumes by these other elements may, for example, impact the strength, electrical, thermal, or fluid transport properties, or other characteristics or properties of the assembly. Such other elements may essentially be virtually any solid material. Other elements may include, but are not limited to, polymeric composites, metallic composites, fiber reinforced composites, polymers, metals, alloys, concrete, cements, glasses, ceramics, ceramic composites, refractory materials, cellulose based materials including wood and wood composites, and the like and combinations thereof. The form of such other elements may include, but is not limited to, blocks, sheets, panels, rods, cylinders, and other geometric forms. In further embodiments, the form of such other elements may include, but are not limited to, fibers, such as glass fibers, including e-glass and s-glass; ceramic fibers, including aluminum oxide fibers; carbon fibers, including graphite fibers, carbon nanotubes, and the like; polymeric fibers, including Aramid and Kevlar; metallic fibers, including wires and meshes; and the like. Such fibrous materials may be utilized as, for example, continuous fibers, non-continuous fibers, chopped fibers, meshes, woven forms including cloths, non-woven forms, and the like. Specific orientations of the fibers may be utilized in some embodiments to provide, for example, for increased assembly strength.

Figure 6:
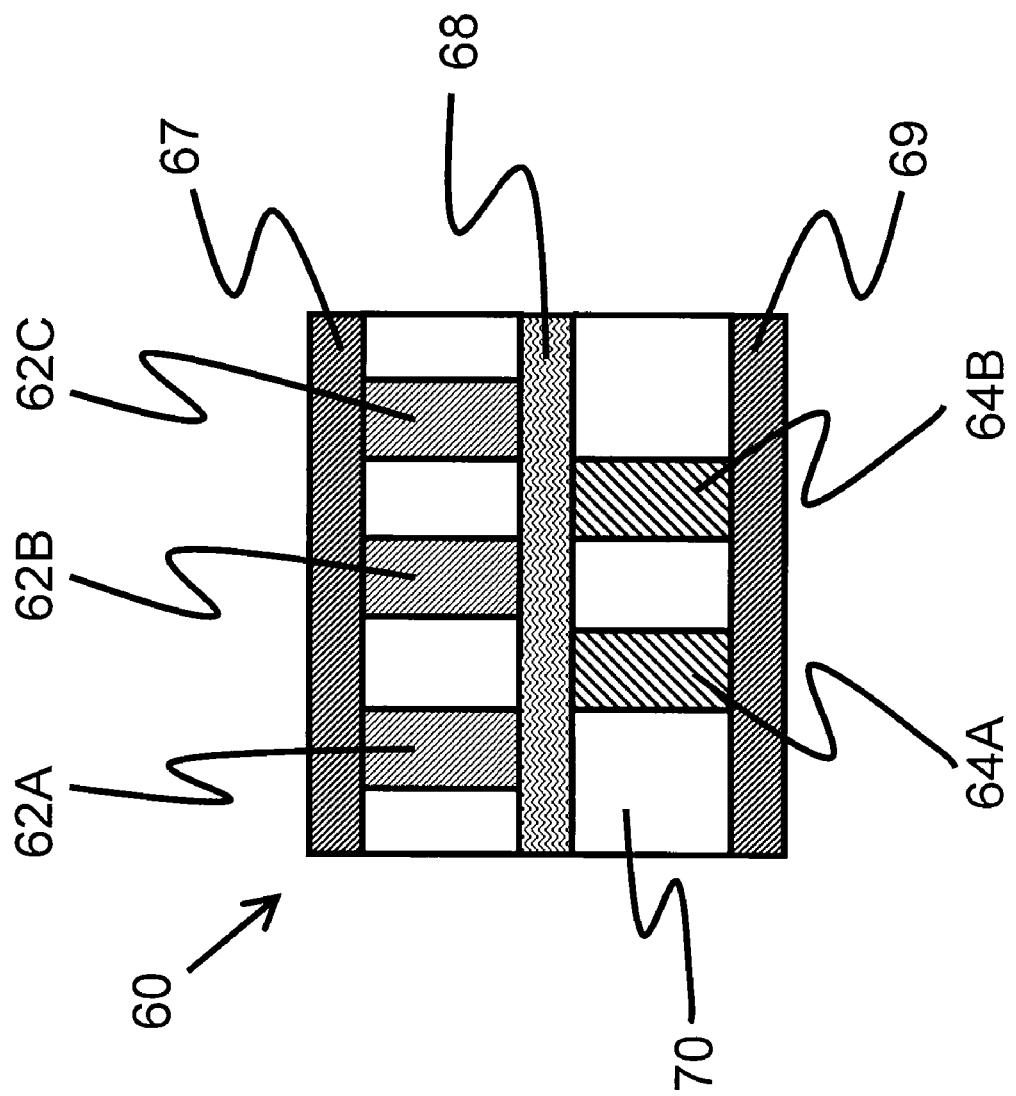
FIG. 6 is a diagrammatic cross-sectional view of an assembly in accordance with a further additional embodiment of the invention.

With reference now to FIG. 6, there is illustrated a assembly 60 in accordance with another additional embodiment of the invention. The assembly 60 comprises three sections of HDCF 62A, 62B, and 62C, and two sections of carbon foam 64A and 64B. The composite 60 further comprises other elements 67, 68, and 69. In this particular example, other element 68 is positioned between the sections of HDCF and sections of carbon foam. Other elements 67, 68, and 69 may be the same or one or more of the elements may be different. As illustrated in FIG. 6, these other elements may also occupy volumes of the assembly not occupied by individual carbon foam and/or HDCF elements. For example, these other elements (i.e. an element composed of other material) may occupy the assembly volume indicated by 70. Alternatively, such a volume may not contain an other element comprised of a solid other material.

In still other embodiments, other materials comprising the carbon foam and HDCF assembly may include mechanical components and/or devices utilized for securing the elements of the assembly in the desired mutual orientation or utilized for securing the assembly in some position relative to an object or location. Such other components may include, but are not limited to, screws, bolts, nuts, clips, strapping, wires, hangers, hinges, hooks, nails, and the like.

Elements of the assembly may also be secured in their desired mutual orientation by designing and fabricating the mutually contacting surfaces of elements of the assembly such that they interlock. For example, designs for joining elements of the assembly may encompass those that are common to the carpentry arts. For example, butt joints, lap joints, dovetail joints, tongue and grove joints, mortise joints, V-groove joints, and the like can all be used to join assembly elements together.

The size and shape of the assemblies of the present invention is not particularly limited and may take on any variety of geometric shapes and configurations depending on the desired location and application for the assembly. Similarly, the size and shape of the HDCF sections and the carbon foam sections is not particularly limited and may adopt a wide variety of sizes and shapes.

The assemblies of the present invention, comprising carbon foam and HDCF, may have utility as blast shields, thermal shields, and composite forming tool bodies.

As the invention has been described, it will be apparent to those skilled in the art that the invention may be varied in many ways without departing from the spirit and scope of the invention. Any and all such modifications are intended to be included within the scope of the appended claims. The invention is limited only by the following claims.

What is claimed is:

1. An assembly comprising at least one section of carbon foam having a density from about 0.05 g/cc to about 1 g/cc and at least one section of high density carbon foam having a density from about 1.2 g/cc to about 2 g/cc, wherein the at least one section of carbon foam and the at least one section of high density carbon foam are held in a fixed relationship.

2. The assembly of claim 1, wherein the at least one section of carbon foam comprises a surface coating.

3. The assembly of claim 2, wherein the surface coating is selected from the group consisting of ceramics, ceramic precursors, metals, paints, carbon, graphite, thermoplastic polymeric materials, thermosetting polymeric materials, epoxies, phenolic resins, nylons, polycarbonates, acrylics, polyethylene, polypropylene, polystyrene, cellulose based materials, wood, composites, fibers, tars, coal tar pitch, petroleum pitch, and asphalts.

4. The assembly of claim 1, wherein the at least one section of high density carbon foam comprises a surface coating.

5. The assembly of claim 4, wherein the surface coating is selected from the group consisting of wherein the surface coating is selected from the group consisting of ceramics, ceramic precursors, metals, paints, carbon, graphite, thermoplastic polymeric materials, thermosetting polymeric materials, epoxies, phenolic resins, nylons, polycarbonates, acrylics, polyethylene, polypropylene, polystyrene, cellulose based materials, wood, composites, fibers, tars, coal tar pitch, petroleum pitch, and asphalts.

6. The assembly of claim 1, wherein the at least one section of carbon foam and the at least one section high density carbon foam are held in a fixed relationship by a bonding material.

7. The assembly of claim 1, wherein the at least one section of carbon foam and the at least one section of high density carbon foam are joined together at a point of mutual contact.

8. The assembly of claim 1, wherein the at least one section of carbon foam is at least partially impregnated with an impregnate.

9. The assembly of claim 8, wherein the impregnate is selected from the group consisting of ceramics, ceramic precursors, metals, paints, carbon, graphite, thermoplastic polymeric materials, thermosetting polymeric materials, epoxies, phenolic resins, nylons, polycarbonates, acrylics, polyethylene, polypropylene, polystyrene, cellulose based materials, wood, composites, fibers, tars, coal tar pitch, petroleum pitch, and asphalts.

10. The assembly of claim 1, wherein the at least one section of high density carbon foam is at least partially impregnated with an impregnate.

11. The assembly of claim 10, wherein the impregnate is selected from the group consisting of ceramics, ceramic precursors, metals, paints, carbon, graphite, thermoplastic polymeric materials, thermosetting polymeric materials, epoxies, phenolic resins, nylons, polycarbonates, acrylics, polyethylene, polypropylene, polystyrene, cellulose based materials, wood, composites, fibers, tars, coal tar pitch, petroleum pitch, and asphalts.

12. The assembly of claim 1, further comprising at least one other element.

13. The assembly of claim 12, wherein the at least one other element is selected from the group consisting of polymeric composites, metallic composites, fiber reinforced composites, polymers, metals, alloys, concrete, cements, glasses, ceramics, ceramic composites, refractory materials, cellulose based materials, wood, wood composites, and combinations thereof.

14. The assembly of claim 1, wherein the at least one section of carbon foam and the at least one section of carbon foam are spaced a distance from one another.

15. The assembly of claim 1, wherein the at least one section of carbon foam and the at least one section of high density carbon foam are secured together with mechanical fasteners.

16. The assembly of claim 1, wherein the at least one section of carbon foam has a compressive strength ranging from about 100 p.s.i. to about 10,000 p.s.i.

17. The assembly of claim 1, wherein the at least one section of carbon foam has a compressive strength ranging from about 400 p.s.i. to about 7,000 p.s.i.

18. The assembly of claim 1, wherein the at least one section of high density carbon foam has a compressive strength ranging from about 5,000 p.s.i. to about 20,000 p.s.i.

19. The assembly of claim 1, wherein the high density carbon foam has a density ranging from about 1.2 g/cc to about 1.8 g/cc.

20. The assembly of claim 1, wherein the high density carbon foam has a density ranging from about 1.3 to about 1.6 g/cc.

* * * * *